US012283195B2

(12) United States Patent
 Leichner

(10) Patent No.: US 12,283,195 B2
(45) Date of Patent: Apr. 22, 2025

(54) MULTI-SENSORY MORSE-CODE TRAINING AND OPERATING TOOL

(71) Applicant: Robert Leichner, Menlo Park, CA (US)

(72) Inventor: Robert Leichner, Menlo Park, CA (US)

( * ) Notice: Subject to any disclaimer, the term of this patent is extended or adjusted under 35 U.S.C. 154(b) by 564 days.

(21) Appl. No.: 17/717,009

(22) Filed: Apr. 8, 2022

(65) Prior Publication Data

US 2023/0326367 A1  Oct. 12, 2023

(51) Int. Cl.
 *G09B 19/26* (2006.01)
 *G09B 5/04* (2006.01)
(52) U.S. Cl.
 CPC .............. *G09B 19/26* (2013.01); *G09B 5/04* (2013.01)
(58) Field of Classification Search
 None
 See application file for complete search history.

(56) References Cited

U.S. PATENT DOCUMENTS

| | | | | |
|---|---|---|---|---|
| 3,713,228 A | * | 1/1973 | Mason | G09B 21/00 434/114 |
| 4,143,648 A | * | 3/1979 | Cohen | A61F 5/58 600/23 |
| 4,661,073 A | * | 4/1987 | Smart | G09B 19/26 434/222 |
| 4,754,416 A | * | 6/1988 | Adams | G08G 3/00 340/985 |
| 5,444,768 A | | 8/1995 | Lemaire et al. | |
| 6,230,139 B1 | * | 5/2001 | Hara | G10L 21/06 434/114 |
| 8,892,232 B2 | | 11/2014 | Suhami | |
| 9,703,381 B2 | | 7/2017 | Gallo et al. | |
| 10,249,216 B1 | | 4/2019 | Brownstein | |
| 2010/0040249 A1 | * | 2/2010 | Lenhardt | H04R 25/505 381/317 |
| 2014/0160044 A1 | | 6/2014 | Yairi et al. | |
| 2019/0114938 A1 | | 4/2019 | Pergande | |
| 2020/0201441 A1 | * | 6/2020 | Rand | G06F 3/016 |

* cited by examiner

*Primary Examiner* — Jay Trent Liddle
*Assistant Examiner* — Alyssa N Brandley
(74) *Attorney, Agent, or Firm* — Robert Brownstein

(57) ABSTRACT

The invention is an adjunct system used in conjunction with a Morse code communications system to provide touch and sight sensory outputs that mirror a Morse code signals audible code-element output.

4 Claims, 5 Drawing Sheets

Incoming Morse Signal Path
with Haptic and Visual Augmentation

Incoming Morse Signal Path 201　　　　202　　　　203

Incoming Morse Signal and Noise 301　　302

MULTI-SENSORY MORSE-CODE TRAINING AND OPERATING TOOL

TECHNICAL FIELD

The invention is a system that augments auditory sensing with haptic and visual sensing for learning and operating using Morse code sending and receiving.

BACKGROUND OF INVENTION

Morse code is a binary system of short- and long-duration audible code elements that are recognized as alphanumeric characters, such as A through Z and 0 through 9. These characters are then used as building blocks to form words, phrases, and messages. The duration of code elements is determined by the duration of a switch or key closure associated with producing an audible tone of similar duration. People have been capable of hearing such code elements and recognizing the alphanumeric characters they represent. This is called "copying." People have also been capable of physically closing a key to produce short- and long-duration code elements so as to convey letter groups, words, phrases and whole messages. This is called "sending."

Copying Morse code messages currently relies upon hearing the audible code elements and recognizing the characters thus conveyed. Signaling lights have been used, for example, between ships wherein short- and long-duration light pulses are sent and copied. Here, copying relies on visually sensing the code elements. Ships relied on signal lighting in place of wireless transmissions as a way of keeping the message both private and line-of-sight, only.

Using Morse-Code signaling via wireless radio carriers has advantages with regard to discerning code elements mixed with receive-channel noise. For example, wireless Morse code signals require a much narrower channel bandwidth than voice signals thereby allowing noise reduction along with commensurately higher signal-to-noise ratio and therefore more efficient communications under weak-signal conditions and/or high ambient atmospheric noise. Morse code signaling using wireless technology relies on keying on and off a continuous-wave (CW) carrier signal. This mode of communications is typically denoted as "CW," referring to the switched carrier signal.

BRIEF DESCRIPTION OF INVENTION

Copying and sending CW signals is primarily making use of auditory senses. When copying, the person hears the audible signal tones and the brain recognizes the characters thus conveyed by tone patterns. When sending, the brain controls hand motion applied to a key or other sending device while simultaneously listening to the audio representation of the code elements being sent. It creates a closed-loop system involving brain, hand, and ears.

It has been found that by relying solely on auditory senses, messaging speed, accuracy and efficiency can be attained, but by adding additional sensory input, such as touch and sight, there can be significant improvements in speed, accuracy and efficiency for the hearing impaired.

The invention herein disclosed and claimed is an adjunct system used in conjunction with audible CW communications systems that adds both haptic (touch) and visual depictions of code elements parallel with those produced as audible tones.

By splitting the audible output path so as to include, in parallel, this invention's audio input path, one ensures sensory parallelism. By detecting code element tones as distinct from noise tones, and filtering out the noise tones, one ends up with unfettered code elements. These can then be used to illuminate a light and trigger a vibrational transducer so as to produce visual and haptic code-element representations in parallel with those conveyed via audible tones.

DETAILED DESCRIPTION OF INVENTION

Figure 1:
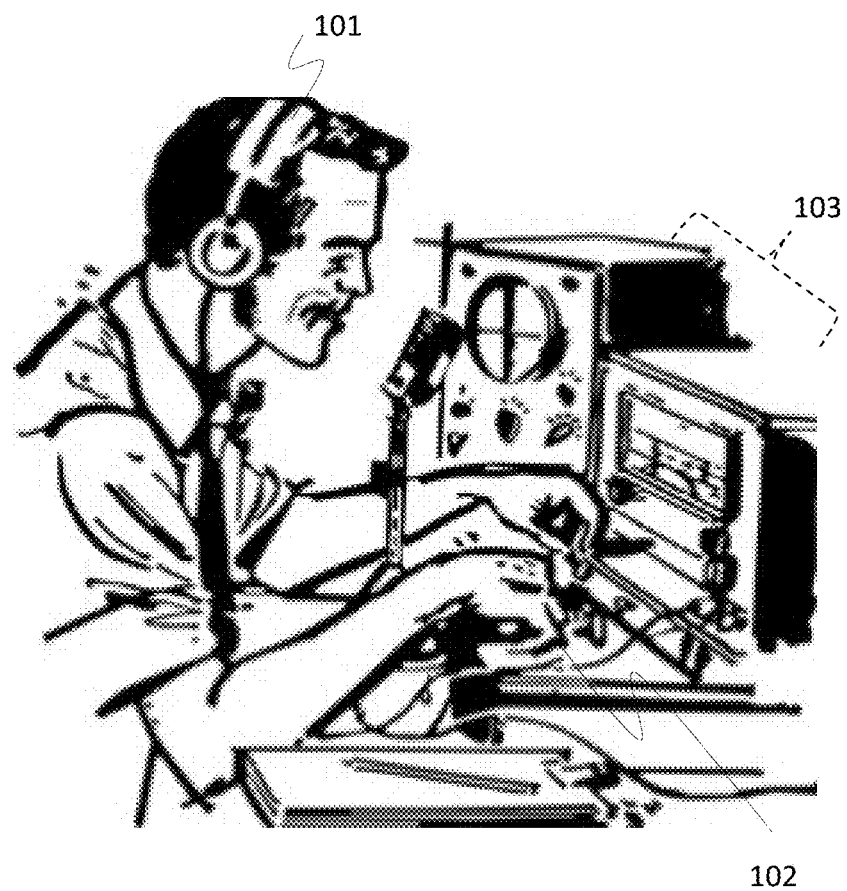
FIG. 1 shows an operator equipped to copy and send wireless Morse code elements.

Today's CW communications systems, such a radio transceivers, rely primarily on auditory sensing when copying and sending code elements. It is found that people with hearing impairment may have difficulty distinguishing the audible code elements from a channel's ambient noise or internal tinnitus sounds. Even CW operators with healthy hearing may have trouble hearing Morse code elements amidst ambient noise, rapid and frequent signal fading, and other audible interference.

The invention herein disclosed and claimed is an adjunct system to audible-signal CW communications systems that combines with the audible tones a physical vibrational and light energy output that mirrors the audible signal in its time-varying characteristics, in particular, relative durations. This is critical because the human's ability to recognize alphanumeric characters based on short- and long-duration code elements relies on the ability to hear and recognize distinct code-element patterns. Similarly, being able to feel and see those same code element durations has been shown to improve speed, accuracy and efficiency of CW communications for the hearing impaired.

In order to insure that code elements are represented by relative durations concurrently, it is important that the same audio output signal from the CW communications device is routed to headphones and this invention simultaneously. This is accomplished by essentially splitting the incoming audio signal into two parallel paths, such as by using a Y connector adaptor. As such, there is no discernible delay between signals conveyed.

Using an audio transducer, such as headphones or loudspeakers, the audible tones are produced and detected by the ear-brain system. The brain then recognizes the code-element patterns and converts them to applicable alphanumeric characters.

Concurrently, the audio output signal split from the headphones/speakers is conveyed to a subsystem wherein the code elements are detected as distinct from any ambient and/or channel noise. Only the code-element audio-frequency signal is then passed on to another subsystem operative to amplify and apply the amplified signal to a vibrational transducer herein referred to as a "shaker," and to a light-emitting diode (LED) light source. The result is vibrational and light energy output that mirrors the audible code-element durations.

In use, as an example, a CW operator copying incoming Morse code audible tones would place a hand on the invention's vibrational transducer subsystem and peer at the LED light source. As the operator was hearing the audible Morse code elements, the operator would also be feeling the vibrational transducer's output and seeing the LED light-source's output.

It has been found that when so doing, operators listening to weak signals (e.g. signals immersed in noise of comparable magnitude) or signals fading in and out due to multipath arrival, will have greater perception of code element output than if relying solely on audible code-element tones.

Wireless Morse code signals, like voice and digital-data signals, are detected in wireless channels that are noisy. The noise is commonly caused by atmospherics (e.g. lightning or other electrostatic discharge, nearby human-operated noise sources (e.g. power supplies, Internet modems, and the like). Depending upon the relative magnitude of code-element signals and noise, the ability to detect patterns accurately can be severely degraded. Because the invention is able to detect the desired code elements from the noise, and filter out all but the code elements, the resulting filtered signal is essentially clean and noise free.

One could filter noise based on relative amplitude wherein only signals above some set amplitude levels are gated through whereas those that are below that level are not passed through. This is called "squelching." One problem is that during fade, if a signal falls below a set threshold, it too is not passed through, so there can be loss in code elements.

The invention herein disclosed filters based on frequency and relative duration rather than relative amplitude. In general, noise signals have much shorter durations than that of code elements, even at 50 words per minute. Thus, by filtering on frequency and duration, rather than amplitude, code elements are effectively distinguished from noise and passed through whereas noise signals are suppressed. For example, if the audio passband is centered at, say, 500 Hz, and the desired signal is centered in the passband, noise and other signals that are not centered can be filtered out. Two distinct CW signals essentially both centered in the passband could be distinguished from one another based on their relative amplitudes. That is, the weaker of the two signals would be filtered out in favor of the stronger.

Thus, it is the filtered code-element signal that is passed through to the shaker tone generator, amplifier and vibrational transducer, and to the LED light source. This tends to make for clean vibrational and light energy output that closely mirrors the code-element signal minus the noise.

An operator can choose to listen to the unfiltered audio input signal, or alternatively, a subsystem of the invention takes the filtered signal, uses it as a solid-state relay input, and reproduces closely the code-element keying. The output of that subsystem can be used as a key input on a conventional code-practice oscillator producing an essentially noise-free code-element audible tone output.

To add more clarity to the disclosure, the following descriptions are figures are provided. FIG. 1 shows a CW communications operator listening with headphones (101) and sending by hand with a key (102). The CW communications system (103) comprises a separate transmitter and receiver. Today, nearly all such systems combine the functions of transmitter and receiver into one transceiver system. The headphones are typically terminated in a male, standard, phone plug; and the Morse code communications system typically has a female, standard, phone socket into which the headphones can be interfaced.

Figure 2:
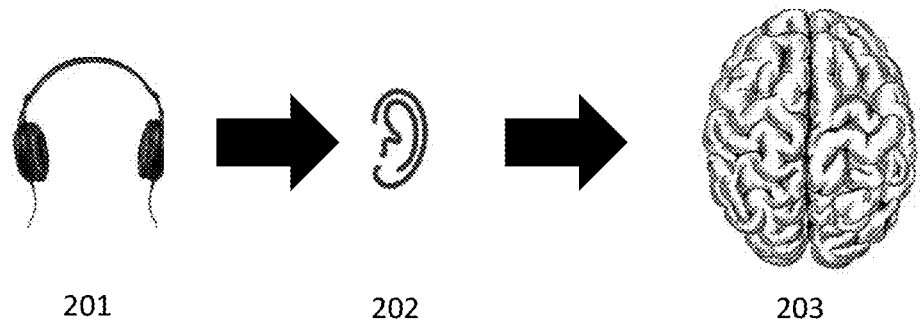
FIG. 2 illustrates the path from headphone, to ear, to brain when copying.
Figure 3:
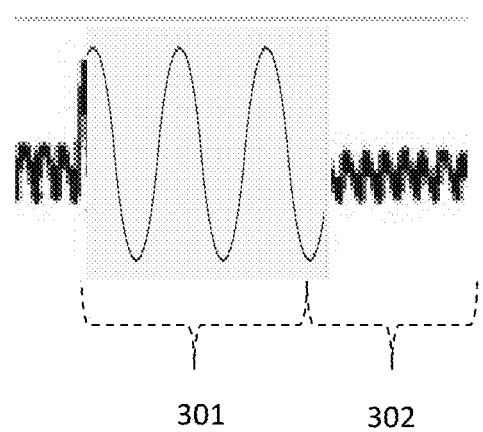
FIG. 3 illustrates how the wireless channel comprises code element signal and noise.
Figure 4:
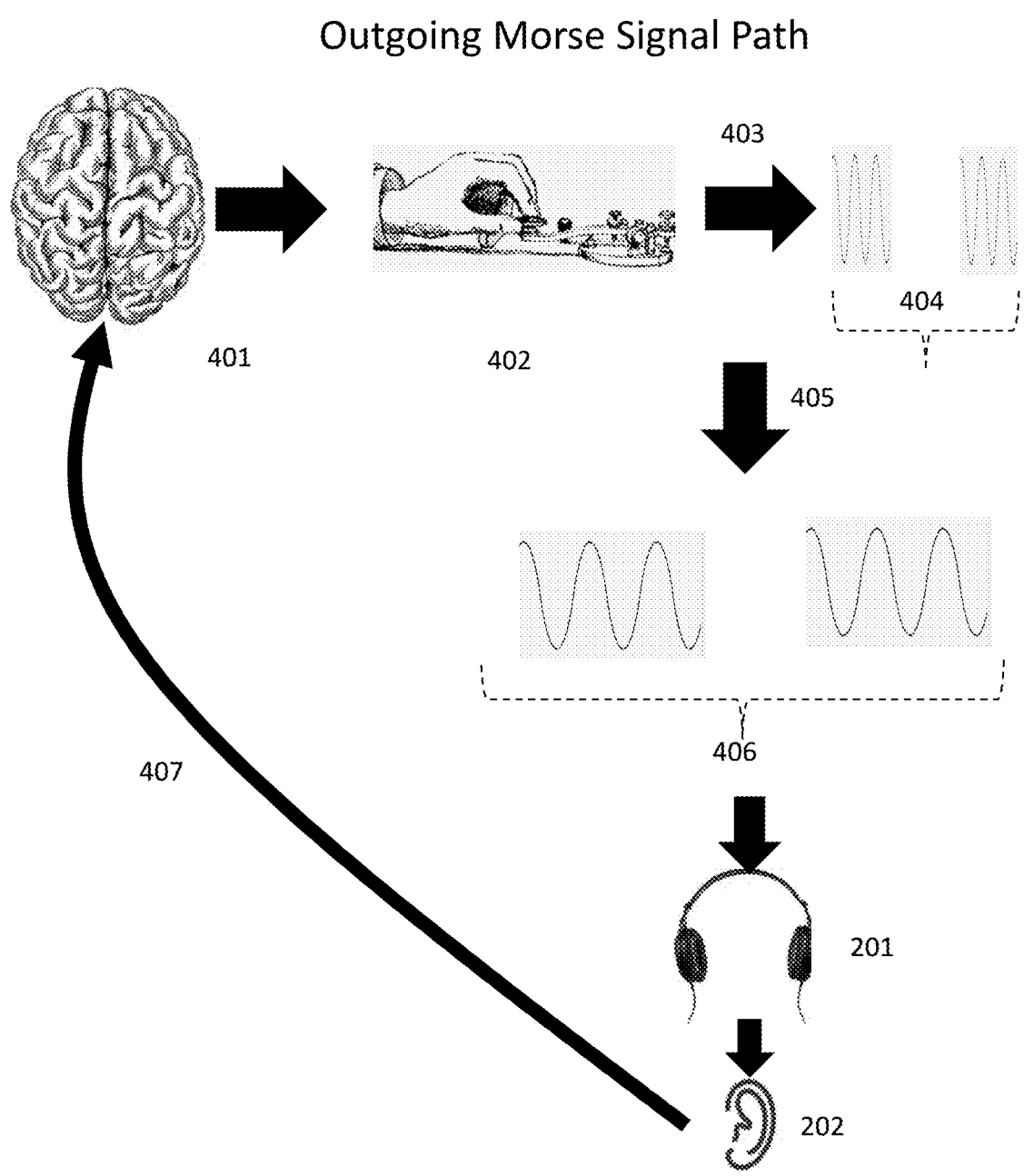
FIG. 4 illustrates the path from brain, to hand, to key, to wireless signal plus parallel generation of side tone, to headphone, to ear and back to brain creating a closed-loop.

It is helpful to look at copying and sending as separate functions. In FIG. 2, the headphones (201) reproduce the CW communications system's audio output signal into a physical sound signal. The ears (202) respond to the sound conveyed to them by the headphones producing an auditory nerve response to the brain (203). The brain, after training and practice, becomes conditioned to quickly discerning code-element tone patterns and converting them into appropriate alphanumeric characters.

What the operator in FIG. 1 hears when a code element is being sent is an audio tone (301) of either a short or long duration combined with channel noise. In between those received code elements, the operator hears channel noise (302).

When sending, the operator in FIG. 1 will decide what sequence of code elements to generate and the operator's brain makes use of a neural path (401) to control a hand on a key (402) wherein the duration of a downward key closure is conveyed (403) to a CW communications system and a wireless code-element signal (404) is generated while concurrently the key-closure durations are input to a side-tone generator (405), operative to produce an audible tone (406) whose duration mirrors that of the signal 404, which is conveyed to headphones (201), to the ears (202) and to the brain via a neural path (407). This is, in effect, a closed-loop wherein as the brain controls the sending hand it hears the results and can determine if it needs to adjust inter-element timing or code-element relative durations.

Figure 5:
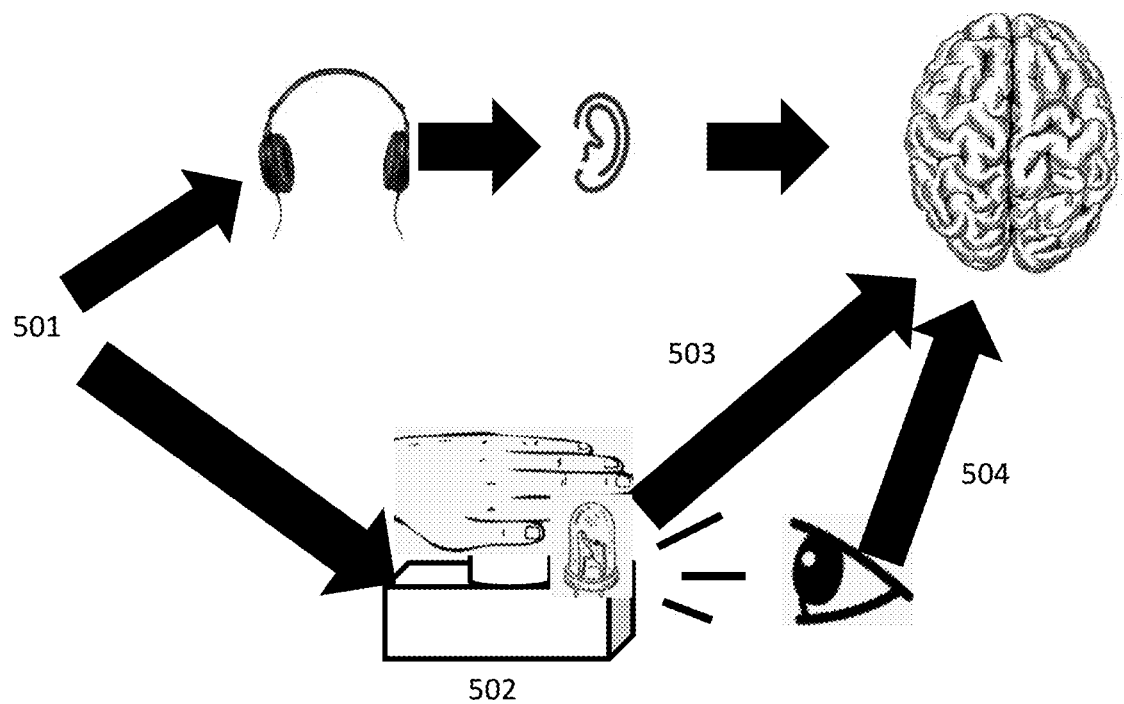
FIG. 5 depicts a system comprising the subsystem represented by FIG. 2 augmented by a subsystem that produces haptic and visual code-element output in parallel with the audible tones.

Up to this point, the figures show conventional CW communications processes wherein ear-brain is used for copying and brain-hand-ear-brain establishes a closed-loop sending process. FIG. 5 introduces an adjunct system to the conventional CW communications system wherein the CW communications system provides an audio output signal (501) which is split conveying identical signals to the headphones, like that of FIG. 2, and to a new subsystem (502) that comprises a subsystem operative to detect code elements amidst the noise, filter out the noise, and use the filtered and discriminated signal to drive a vibrational transducer upon which a user's hand rests, conveying the touch sensations to the brain via neural path 503. Concurrently, the user's eye sees light pulses whose durations mirror that of the code elements and an optical neural path (504) conveys those visual sensations to the brain. The essence of adding the adjunct subsystem is to augment just the audible tone with a haptic and a visual sensation, concurrently. One result is that what may have been mistaken for, say, a short-duration audible code element is not corroborated by touch or sight inputs. As a result the operator learns quickly to ignore sounds that are not corroborated. It becomes an unconscious filtering that can improve speed, accuracy and efficiency.

Figure 6:
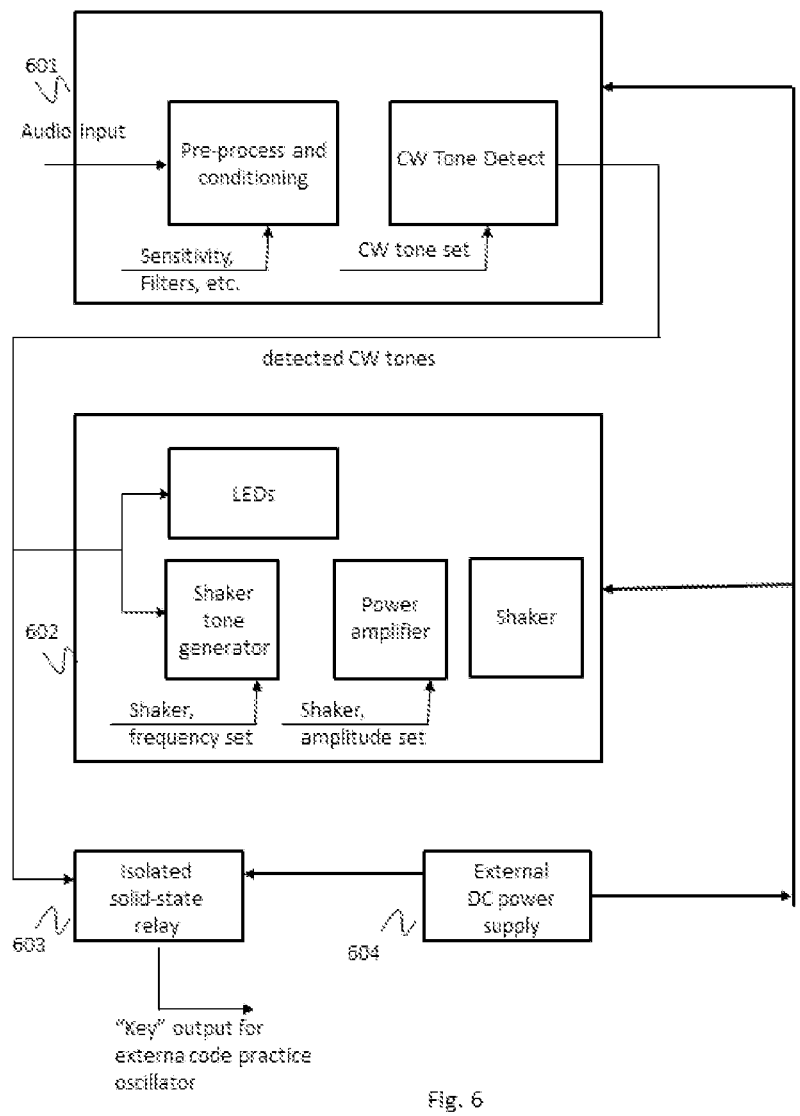
FIG. 6 shows an embodiment of the invention comprising CW tone detection plus haptic and visual display subsystems.

FIG. 6 shows the details of the adjunct subsystem from FIG. 5 (502). The CW tone detection subsystem (601) comprises a CW tone detect subsystem in which the CW communications system's audio output becomes this subsystem's audio input (as shown). It is operative to allow adjusting amplifier sensitivity to compensate for weak or strong signals, and operative to allow a user to set side-tone frequency. For example, a contemporary CW communications wireless transceiver typically provides side-tone setting capability wherein the user can set the side-tone heard when sending to, say, 500 Hz. Once set, received signals at 500 Hz tone are optimized while tuning the transceiver. By setting the CW tone-detect subsystem to a CW tone setting of 500 Hz, it, too will optimize detection of 500 Hz side tones. Thus, noise which is narrower and shorter in duration than the CW signal, and is spread across the CW system's audio passband will be filtered out (called "pre-processing and conditioning"). If there is only one signal centered at 500 Hz, it will be passed through with noise filtered out. It there are two or more signals centered at 500 Hz, the pre-process and conditioning block may discriminate and pass the signal having the higher amplitude.

The filtered and discriminated signal output from the CW tone-detect subsystem now enters two other subsystems, an isolated solid-state relay subsystem (603) in which the detected CW tones are converted to key-closure signals that can be used as inputs to a code-practice oscillator; and to a haptics and visual display subsystem (602) wherein the CW detect filtered and discriminated signal directly drives an LED light source, and a shaker "tone" generator that can be set to vibrate at a selected frequency. The output of the shaker "tone" generator is then amplified and drives the shaker transducer. That amplifier may have its amplitude set to vary the vibrational amplitude of the shaker. All of the subsystems in FIG. 6 are powered by a power supply (604) which is labeled as "external," but may, in fact, be internal, as well. The power supply could also be provided by internal batteries. It may also derive power from a system to which it is connected.

All of the components comprising the invention are known and available. The circuits for constructing the subsystem function blocks are well known in the art. It is the combining of these functional blocks, with Morse code communications systems, so as to provide contemporaneous audible, physical and visual responses, that is novel. The various functional blocks can be implemented using discrete components, or highly integrated circuits, or combinations thereof. These functional blocks can also be included in the overall functionality of a Morse code communications system. The algorithms used for code tone detect filtering can be implemented using a microcontroller and program, or implemented in hardware in a semi-custom or custom integrated-circuit. Nothing should be read as limiting the scope of the invention in terms of implementation manifestations. It is the functions and their interrelationships that constitute the invention rather than their physical implementation.

What is claimed is:

1. A system comprising:
    a CW tone detection subsystem operative to detect CW tones and filter out noise;
    a haptics and visual display subsystem operative to convert the detected CW tones into physically sensed vibrations and visually sensed light;
    a solid-state relay subsystem operative to convey the detected CW tones into on-off keying of a code-practice oscillator; and
    a power supply operative to provide electrical power to the CW tone detection, haptics and visual display, and solid-state relay subsystems.

2. The system as in claim 1 wherein:
    said CW tone detection subsystem comprises:
        a pre-processing and conditioning block operative to amplify an audio input signal and produce an optimal magnitude audio output signal having identical time-varying signal characteristics as the audio input signal; and
        said pre-processing and conditioning block is further operative to detect signals having a prescribed frequency and short- and long-duration patterns from within said optimal magnitude audio output signal and to pass only signal components having said prescribed frequency and short- and long-duration patterns as a filtered input signal.

3. The system as in claim 2 wherein:
    said haptics and visual display subsystem comprises:
        at least one light-emitting diode light source operative to receive said filtered input signal and illuminate so as to represent with light pulses said identical time-varying signal characteristics;
        a shaker tone generator operative to produce an electrical signal turned on and off by said filtered input signal's said identical time-varying signal characteristics;
        a power amplifier operative to amplify said electrical signal turned on and off by said filtered input signal's said identical time-varying signal characteristics and provide that amplified signal as a shaker input signal to a vibrational transducer;
        said vibrational transducer operative to respond to said shaker input signal by producing a vibratory response whose frequency of vibration is determined by said shaker input signal's frequency;
        said shaker tone generator's frequency is predetermined by a shaker-tone frequency setting; and
    said power amplifier's output signal amplitude is predetermined by an amplitude setting.

4. The system as in claim 2 wherein:
    said solid-state relay subsystem is operative to receive the filtered input signal and convert the identical time-varying characteristics of said filtered input signal into an output signal operative to provide a keying input signal to the code-practice oscillator.

* * * * *